US011290977B1

(12) United States Patent
Chinnapalli

(10) Patent No.: US 11,290,977 B1
(45) Date of Patent: Mar. 29, 2022

(54) SYSTEM FOR LOCALIZING WIRELESS TRANSMITTERS WITH AN AUTONOMOUS MOBILE DEVICE

(71) Applicant: AMAZON TECHNOLOGIES, INC., Seattle, WA (US)

(72) Inventor: Sai Prashanth Chinnapalli, Dublin, CA (US)

(73) Assignee: AMAZON TECHNOLGIES, INC., Seattle, WA (US)

( * ) Notice: Subject to any disclaimer, the term of this patent is extended or adjusted under 35 U.S.C. 154(b) by 0 days.

(21) Appl. No.: 16/934,940

(22) Filed: Jul. 21, 2020

(51) Int. Cl.
*H04W 24/00* (2009.01)
*G08B 1/08* (2006.01)
*G01S 13/74* (2006.01)
*G01S 5/02* (2010.01)
*H04W 64/00* (2009.01)
*H04W 4/02* (2018.01)
*G01S 5/14* (2006.01)
*H04B 7/08* (2006.01)
*H04L 101/622* (2022.01)

(52) U.S. Cl.
CPC .............. *H04W 64/003* (2013.01); *G01S 5/14* (2013.01); *H04B 7/0897* (2013.01); *H04L 61/6022* (2013.01); *H04W 4/025* (2013.01)

(58) Field of Classification Search
CPC ....... H04W 64/003; H04W 4/025; G01S 5/14; H04B 7/0897; H04L 61/6022
USPC ...................................................... 455/456.1
See application file for complete search history.

(56) References Cited

U.S. PATENT DOCUMENTS

| 10,524,225 B1* | 12/2019 | Boross | G01S 5/0295 |
|---|---|---|---|
| 2005/0218292 A1* | 10/2005 | Kawabe | G01S 7/003 |
| | | | 250/206 |
| 2007/0197229 A1* | 8/2007 | Kalliola | H04W 4/029 |
| | | | 455/456.1 |
| 2012/0072110 A1* | 3/2012 | Venkatraman | G01S 5/0252 |
| | | | 701/434 |
| 2013/0084892 A1* | 4/2013 | Teyeb | H04W 48/16 |
| | | | 455/456.6 |
| 2013/0099976 A1* | 4/2013 | Cornwall | G01D 4/006 |
| | | | 342/450 |
| 2016/0260059 A1* | 9/2016 | Benjamin | G06Q 10/0832 |
| 2017/0188228 A1* | 6/2017 | Shtrom | H04W 4/02 |

(Continued)

FOREIGN PATENT DOCUMENTS

CN          101094024 A   *  12/2007

*Primary Examiner* — Mark G. Pannell
(74) *Attorney, Agent, or Firm* — Lindauer Law, PLLC

(57) ABSTRACT

An autonomous mobile device (AMD) moves within a physical space. Various wireless devices with transmitters may be present, such as internet of things (IoT) devices, smartphones, tablets, user devices, and so forth. At different physical locations in the physical space a radio receiver of the AMD receives radio signals sent by transmitters sending data. Data is stored that is indicative of the physical location where the data was acquired, an identifier of the transmitter, and a received signal strength indication (RSSI). Estimated distances, each with respect to a different physical location, are determined based on the received signal strength. A plurality of the estimated distances and associated physical locations are used to determine an estimated location of a transmitter. For example, the estimated transmitter location may be determined as a point where the estimated distances coincide.

20 Claims, 6 Drawing Sheets

(56) References Cited

U.S. PATENT DOCUMENTS

2018/0004178 A1* 1/2018 Haines .................... F24F 11/61
2018/0348352 A1* 12/2018 Ogston .................. G01S 13/75

* cited by examiner

| | | RADIO DATA 134 | | | | |
|---|---|---|---|---|---|---|
| LOCATION DATA 140 (X,Y) | ANTENNA HEIGHT 402 | SIGNAL STRENGTH DATA 410 | TRANSMITTER ID DATA 150 | TIMESTAMP DATA 414 | RECEIVED DATA 416 | ESTIMATED DISTANCE 420 |
| 47, 179 | 30 | 35 | EB:B4:9A:C2:... | 20062701225 | - | 170 |
| 51, 145 | 90 | 40 | EB:B4:9A:C2:... | 20062701237 | - | 162 |
| 49, 100 | 30 | 47 | E9:ED:A0:CB:... | 20062701247 | - | 150 |
| 50, 37 | 90 | 53 | E9:ED:A0:CB:... | 20062701255 | - | 137 |
| 45, 39 | 30 | 65 | C5:12:1F:5F:... | 20062701263 | TX PWR -60 DBM | 77 |
| ... | | ... | ... | ... | ... | ... |

SYSTEM FOR LOCALIZING WIRELESS TRANSMITTERS WITH AN AUTONOMOUS MOBILE DEVICE

BACKGROUND

An autonomous mobile device (AMD) moves throughout a physical space. Various wireless devices that include radio transmitters may also be present in the physical space.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
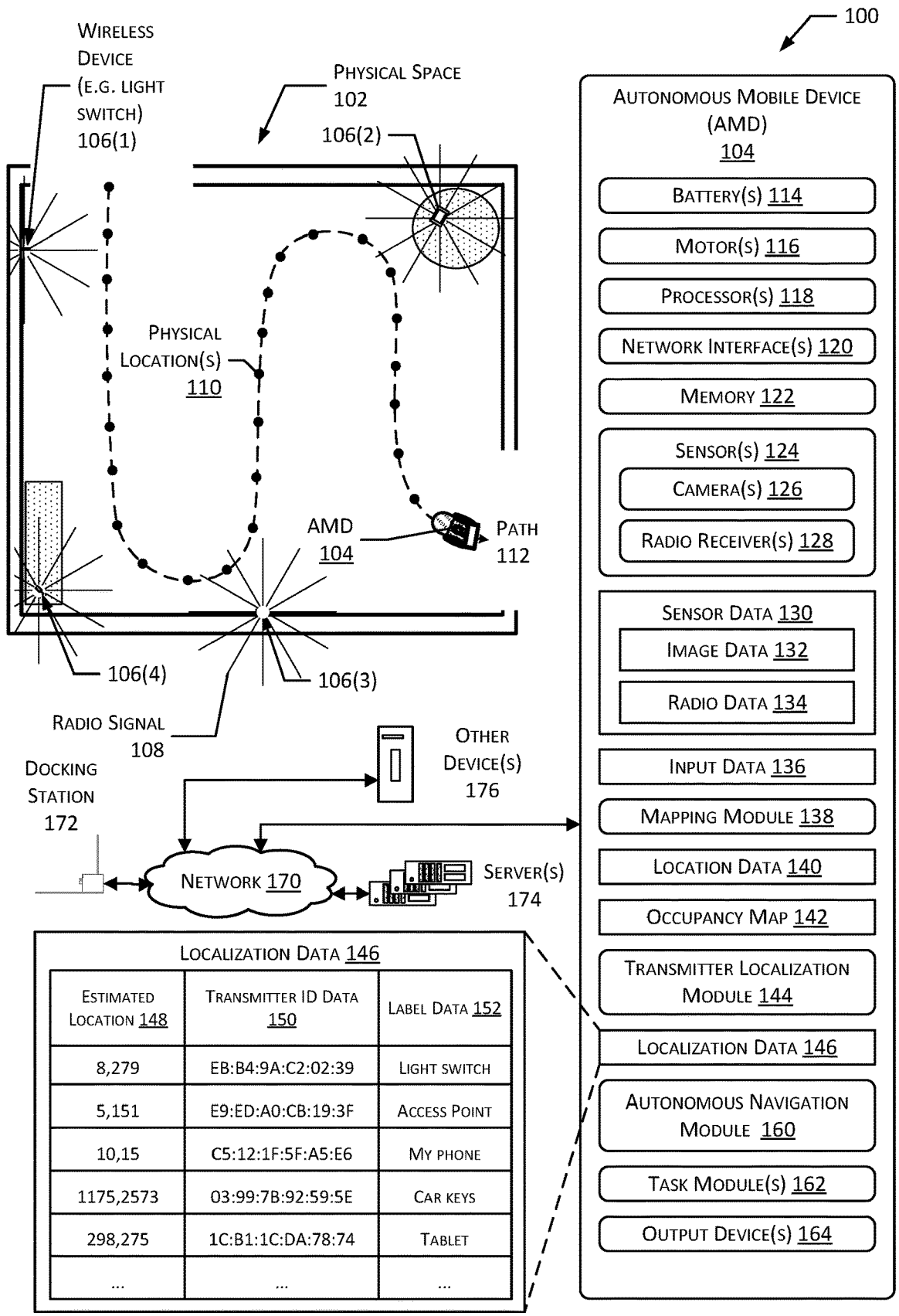
FIG. 1 illustrates a system for an autonomous mobile device (AMD) to determine locations of radio transmitters in a physical space, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may perform sentry tasks involving moving through rooms in the physical space.

The physical space may include a variety of wireless devices that may include radio transmitters. For example, the wireless devices may comprise wireless access points, smartphones, tablets, laptops, key fobs, asset tracking devices, internet-of-things (IoT) devices, and so forth. Some of the wireless devices may be fixed relative to the physical space, others may be mobile. For example, a wireless access point may be stationary while a pair of Bluetooth headphones may be moved by a user from one location in the physical space to another.

Stationary devices may experience connectivity issues due to congestion or interference from nearby devices. This may impair the ability of the stationary device to access the wireless network to send or receive data, increase power consumption in an attempt to overcome the interference, and so forth. For example, a first wireless device may be frequently transmitting data, preventing a nearby second wireless device from accessing the wireless network. Mobile devices may experience these issues, as well as the potential for being misplaced. For example, a user may forget where they previously placed a smartphone, wireless headphones, and so forth.

Traditionally, the ability to localize or determine where a radio transmitter is has been grossly imprecise or technologically challenging to achieve. For example, a user with a device such as a smartphone that includes a built-in global navigation satellite system (GNSS) such as a Global Position System (GPS), may be able to locate their smartphone indoors at a given house. But they are unable to locate that smartphone as being within a particular part of a room of the house. Other technologies to determine the location of a wireless device may use precise timing in which an interrogating transmitter sends a signal, which the wireless device receives and then transmits a reply. By measuring the time of flight and a known time to send the reply, the distance to the wireless device may be determined. By measuring the distances using several interrogating transmitters, a location of the wireless device may be calculated. However, this technique is expensive to implement and requires active participation between the interrogating transmitter and the wireless device.

Described in this disclosure are techniques and systems to use an AMD to gather data that is then used to determine estimated locations of transmitters in the physical space. These techniques and systems may be implemented without modification to existing wireless devices, allowing backward and forward compatibility. No additional network traffic is generated while determining the estimated transmitted locations, reducing network congestion and improving overall network efficiency. The techniques and systems described are agnostic to a particular protocol, and so may be implemented to determine estimated locations of devices that use a wide variety of different wireless protocols and technologies. For example, estimated locations of transmitters may be determined for wireless devices utilizing WiFi, Bluetooth, Bluetooth Low Energy, ZigBee, RuBee, LoRa, and so forth.

The AMD gathers information about radio signals received as it moves through the physical space. While moving, the AMD determines location data indicative of the physical locations in the physical space where it has been. Meanwhile, a radio receiver of the AMD gathers radio data resulting from radio transmitters sending beacons, service announcements, data traffic, and so forth. The radio data includes signal strength data indicative of the received signal strength of the radio transmission. For example, the radio data may include a received signal strength indicator (RSSI)

value that is associated with a particular wireless frame that was received by the radio of the AMD. The radio data also includes transmitter identification (ID) data that is used to determine which radio transmitter sent the radio signal that was received. The transmitter ID may be one or more of beacon data, a media access control (MAC) address, a network address, and so forth. For example, a sender MAC address in a wireless frame may be used to determine that a radio signal was sent by a particular radio transmitter. In this way, radio signals and corresponding received signal strength acquired at different physical locations and at different times may be associated with a particular radio transmitter of a wireless device.

The radio data may also include a timestamp indicative of a time associated with the acquired data. The radio data may also include received data. For example, the received data may comprise data indicative of a transmit power level used by the radio transmitter while sending the radio signal that was received.

The first set of data may also include other data, such as an antenna height associated with the location data. In some implementations, the AMD may have an extensible mast or other member that includes an antenna connected to the radio receiver of the AMD. Radio data may thus be acquired at different heights above ground. Radio data from different heights may be used to determine a height of the estimated location of the transmitter above ground.

As the AMD moves through the physical space a first set of data is determined. This first set of data comprises at least the location data indicative of the location in the physical space where radio data was acquired and the radio data. This movement may be the result of a process to explore the physical space, while performing a sentry function, responsive to a task assigned by a user, and so forth.

A second set of data is determined, based on the first set of data. The transmitter ID for a particular wireless device is selected, and a set of location data and signal strength data associated with the transmitter ID is further processed. A plurality of locations indicated by the location data for the transmitter ID are selected. For example, a random selection of locations may be made. The signal strength data associated with the selected locations is used to determine estimated distances for each of those selected locations.

In one implementation the estimated distance may be determined using a path loss model. The strength of a received radio signal is proportionate to the distance to the transmitter. As distance increases, the received signal strength decreases in a mathematically predictable way.

In another implementation, a machine learning system such as a neural network, may be trained to accept signal strength data as input and provide as output the estimated distance. For example, training data comprising location data and predetermined physical locations at known distances to radio transmitters may be obtained in a test environment. The training data may be used to train a neural network to determine the estimated distance. The training data may be acquired using a particular hardware configuration, such as the make and model of a radio receiver used by the AMD, antenna configuration and placement of the antenna on the AMD, and so forth. For example, the training data may result in the neural network being trained to implicitly take into consideration antenna gain.

The estimated distance is an estimate of the distance between the location in the physical space at which the signal strength data was acquired and the antenna(s) of the radio transmitter that radiated the radio signal that was received by the AMD. This estimated distance may be visualized as a circle that is centered on the location in the physical space where the signal strength data was acquired.

The plurality of estimated distances and the location data indicative of their respective physical locations may be used to determine the estimated location of the transmitter. In one implementation, a multilateration algorithm may be used to determine the estimated location of the transmitter. The multilateration algorithm may be visualized as finding an intersection point between a set of three or more circles. Each circle is centered on a different physical location and has a radius equal to the estimated distance. To determine an estimated location of the transmitter in two-dimensional space, at least three pairs of location data and estimated distances are needed. In a similar fashion, an estimated height relative to the AMD may be determined using radio data obtained at different heights, allowing the estimated location of the transmitter to be established in three-dimensional space.

For ease of illustration, and not by way of limitation, this disclosure discusses determining estimating the location of a radio transmitter. It should be understood that the actual location determined is that of an antenna(s) actually radiating the radio frequency signal generated by the radio transmitter. For the purposes of discussion it may be assumed that the radio transmitter and antennas are generally present within the same volume of space. In other implementations, the transmitter and antenna may be separated, such as by a coaxial cable. In these implementations, the estimated location would be of the antenna and not the radio transmitter itself.

Localization data may be determined that associates estimated locations of transmitters with respective transmitter IDs and labels. The label may comprise a user-friendly name that is associated with a transmitter ID, such as "light switch", "my phone", or "car keys".

The localization data may then be used in a variety of ways. For example, the user may ask the AMD "where are my car keys?". The AMD would recognize the object "car keys" and look up the estimated location of the transmitter from the localization data. The AMD may then perform one or more actions to assist the user. For example, the AMD may present output indicative of the estimated location of the transmitter, such as presenting on a display a picture of the car keys on a table. In another example, the AMD may move to a location near the estimated location of the transmitter and orient the body of the AMD towards the estimated location of the transmitter. In yet another example, the AMD may move to the estimated location of the transmitter, retrieve the car keys, and bring them to the user.

By using the techniques described in this disclosure, the AMD is able to quickly and efficiently determine estimated locations of the transmitter for wireless devices present in a physical space. Estimated locations of the transmitters may be determined without interrogation or interaction between the AMD and the wireless device. Localization data may be determined for a wide variety of devices and wireless protocols. The movement of the AMD through the physical space provides the ability to gather radio data from many locations, allowing a comprehensive set of localization data to be determined and updated in an ongoing basis. Security for the user is also substantially improved by facilitating the detection and localization of previously unreported wireless devices. For example, if an unknown wireless device is brought into range of the radio receiver of the AMD, the AMD may provide the user with an alert and an estimated location of the transmitter. This allows the user to readily determine if the unknown device is permitted or not.

Illustrative System

FIG. 1 illustrates a system 100 for determining the location of radio transmitters in a physical space 102 using an autonomous mobile device (AMD) 104, according to some implementations. In this illustration, a portion of the physical space 102 comprising a single room is shown. Within the physical space 102 are a number of wireless devices 106 including a network-controlled light switch 106(1), a smartphone 106(2), a wireless access point 106(3), car keys with a tracking fob 106(4), and so forth. Each of these wireless devices 106 includes a radio transmitter that emits a radio signal 108.

During operation, the AMD 104 is present at many physical locations 110 within the physical space 102. These physical locations 110 represent points in the physical space 102 where the AMD 104 was either in motion or stopped. The AMD 104 may acquire information about the radio signals 108 received at one or more of these physical locations 110. The physical locations 110 are shown along a path 112 that the AMD 104 has taken through the physical space 102. As described below in more detail, the data acquired by the AMD 104 at these various physical locations 110 may be used to determine localization data indicative of estimated locations of the transmitters.

The AMD 104 may include a battery(s) 114 to provide electrical power for operation of the AMD 104. The battery 114 that may be rechargeable, allowing it to store electrical energy obtained from an external source. In other implementations a wireless power receiver may be used to provide power for operation of the AMD 104, recharge the battery 114, and so forth.

One or more motors 116 or other actuators enable the AMD 104 to move from one location in the physical space 102 to another. For example, a motor 116 may be used to drive a wheel attached to a chassis of the AMD 104, which causes the AMD 104 to move. The AMD 104 may turn, move forward, move backward, and so forth.

During use, a user may issue a command. For example, the user may provide speech input by uttering the command "robot, come here". In another example, the user may indicate the command using a computing device, such as a smartphone or tablet computer. Data indicative of the command may then be provided to the AMD 104.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interfaces 120. The network interfaces 120 may include devices to connect to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth. The network interfaces 120 that provide for wireless data transfer may include one or more radio receivers.

The AMD 104 includes one or more memories 122. The memory 122 may comprise one or more non-transitory computer-readable storage media (CRSM). The CRSM may store instructions that are executed by the one or more processors 118.

The AMD 104 may include one or more sensors 124. For example, the sensors 124 may include one or more cameras 126, depth cameras, LIDAR, and so forth. The sensors 124 also include one or more radio receivers 128. In some implementations the radio receivers 128 may be part of the one or more network interfaces 120. The sensors 124 may generate sensor data 130. For example, the cameras 126 may generate image data 132. In another example, the radio receivers 128 may generate radio data 134. The sensors 124 are discussed in more detail with regard to FIG. 3. The radio data 134 may comprise one or more of signal strength data indicative of a received signal strength of the radio signals 108, transmitter identifier (ID) data indicative of the radio transmitter that transmitted the radio signal 108, timestamp data indicative of when the data was acquired, and so forth. For example, the radio data 134 may comprise a received signal strength indicator (RSSI) value provided by a network interface 120 upon receipt of a frame of data received by the radio receiver 128. The transmitter ID may be based on information such as a sender media access control (MAC) address included in the frame of data, or other information. The radio data 134 is discussed in more detail below with regard to FIG. 4.

During operation, the AMD 104 may determine input data 136. The input data 136 may include or be based at least in part on sensor data 130 from the sensors 124 of the AMD 104. In one implementation, a speech processing module may process raw audio data obtained by the microphone on the AMD 104 and produce input data 136. For example, the user may say "robot, find my phone" which may produce input data 136 "locate my phone".

A mapping module 138 may use sensor data 130 to determine location data 140 and an occupancy map 142. The location data 140 comprises information that is indicative of the physical location 110 of the AMD 104 in the physical space 102. For example, the location data 140 may indicate the position of the AMD 104 as a set of cartesian coordinates with respect to an origin point or datum in the physical space 102. In one implementation, the mapping module 138 may use one or more simultaneous localization and mapping ("SLAM") techniques. For example, the SLAM algorithms may utilize features present in the image data 132 acquired at the different physical locations 110 to determine the location data 140.

The occupancy map 142 may comprise data that indicates the location of one or more obstacles, such as a table, wall, stairwell, furniture, and so forth. In some implementations, the occupancy map 142 may comprise a plurality of cells with each cell of the plurality of cells representing a particular area in the physical space 102. Data, such as an obstacle value, may be stored that indicates whether a cell associated with an area in the physical space 102 is occupied by an obstacle, is unoccupied, or is unobserved. An obstacle may comprise an object or feature that prevents or impairs traversal by the AMD 104. For example, an obstacle may comprise a wall, stairwell, and so forth. The occupancy map 142 has a boundary. The boundary may be representative of the extent to which the AMD 104 has acquired data about the physical space 102. For example, the boundary may comprise the obstacles associated with the outermost walls of a home or office. In another example, the boundary may comprise a portion of the physical space 102 that is enclosed and unexplored by the AMD 104. Continuing the example, an unopened mechanical closet within the physical space 102 that the AMD 104 has not acquired sensor data 130 of may be considered outside of the boundary of the occupancy map 142.

The occupancy map 142 may be manually or automatically determined. For example, during a learning phase the user may take the AMD 104 on a tour of the physical space 102, allowing the AMD 104 to explore and generate the occupancy map 142 and associated data, such as tags designating a particular obstacle type, such as "furniture" or "fragile". In another example, during subsequent operation, the AMD 104 may generate the occupancy map 142 that is indicative of locations and types of obstacles such as chairs, doors, stairwells, and so forth as it moves unattended through the physical space 102. The occupancy map 142 may include information such as tags or labels that designate particular rooms or portions of the physical space 102, and so forth.

In some implementations, information associated with the physical space 102 may be stored as a multi-layered data structure. For example, a first layer may comprise the information associated with the occupancy map 142, providing information about obstacle values associated with particular areas in the physical space 102. A second layer may comprise tags. A third layer may comprise data indicative of radio data 134, and so forth. For example, the radio data 134 may be associated with a particular location in the physical space 102 that corresponds to where the AMD 104 was at the time that radio data 134 was acquired.

Modules described herein, such as the mapping module 138, the autonomous navigation module 160 and so forth may provide various processing functions such as de-noising, filtering, and so forth. Processing of sensor data 130, such as image data 132 from a camera, may be performed by a module implementing, at least in part, one or more of the following tools or techniques. In one implementation, processing of image data 132 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 130. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, finite state machines, and so forth, may also be used to process the sensor data 130 or other data. For example, the ANN may be trained using a supervised learning algorithm such that object identifiers are associated with images of particular objects within training images provided to the ANN. Once trained, the ANN may be provided with the sensor data 130 and produce output indicative of the object identifier. In another example, an ANN may be trained to determine an estimated distance based on received signal data indicated in the radio data 134.

During operation of the AMD 104, in particular while the AMD 104 moves through the physical space 102, the radio data 134 and associated location data 140 is acquired. The transmitter localization module 144 uses the radio data 134 obtained from different physical locations 110 to determine localization data 146. The localization data 146 may comprise an estimated location 148 of a transmitter and one or more of transmitter identifier (ID) data 150, label data 152, or other data.

The estimated location 148 of a transmitter is indicative of a physical location 110 in the physical space 102. For example, the estimated location 148 of a transmitter may be expressed as cartesian coordinates relative to a datum in the physical space 102. In another example, the estimated location 148 of a transmitter may be expressed as a particular cell associated with the occupancy map 142. In some implementations the estimated location 148 of a transmitter may include information indicative of a height. For example, the estimated location 148 of a transmitter may be indicative of a height above ground.

The transmitter ID data 150 provides information indicative of a particular radio transmitter associated with a wireless device 106. The transmitter ID data 150 may be one or more of a beacon data, a media access control (MAC) address, a network address, and so forth. For example, the transmitter ID data 150 may be a sender MAC address that is included during transmission of wireless frames. By using the transmitter ID data 150, the radio data 134 acquired at different physical locations 110 and at different times may be associated with a particular wireless device 106.

The label data 152 may comprise data that is associated with one or more of the estimated location 148 of a transmitter, the transmitter ID data 150, or other data. The label data 152 may comprise data that is indicative of a user-friendly name. For example, the label data 152 may be "light switch", "access point", "my phone", or "car keys".

In other implementations the localization data 146 may include other data. For example, the localization data 146 may include last heard timestamp data indicative of a last time that particular transmitter ID data 150 was detected. If the last heard timestamp data indicates more than a threshold interval of time has elapsed since radio data 134 associated with that transmitter ID data 150 has been acquired, the estimated location 148 of a transmitter may be deemed to be unknown or unreliable. If a command was issued to find the associated wireless device 106, the command may return an error message as a result of the unknown or unreliable determination.

The transmitter localization module 144 determines the estimated location 148 of a transmitter based on pairs of data comprising radio data 134 indicative of received signal strength associated with particular transmitter ID data 150 and location data 140 indicative of a location in the physical space 102 of the AMD 104 at the time the radio data 134 was acquired. At any given physical location 110 where radio data 134 is available, the AMD 104 can calculate an estimated distance to the radio transmitter of the wireless device 106 that is emitting the radio signal 108. The estimated distance for a single location does not allow for the determination of a particular location in the physical space 102. By using the estimated distances that are associated with a plurality of physical locations 110, the estimated location 148 of a transmitter may be determined. This process may include the use of a multilateration algorithm and is discussed in more detail with regard to FIG. 4.

The estimated distance may be determined in several ways. In one implementation the estimated distance may be determined using a path loss model. The strength of a received radio signal 108 is proportionate to the distance between the receiver and transmitter. As distance increases, the received signal strength decreases in a mathematically predictable way. This technique is discussed in more detail with regard to FIG. 4.

In another implementation, a machine learning system such as a neural network, may be trained to accept signal strength data as input and provide as output the estimated distance. For example, training data comprising location data 140 and predetermined physical locations at known distances to radio transmitters may be obtained in a test environment. The training data may be used to train a neural network to determine the estimated distance. The training data may be acquired using a particular hardware configuration, such as the make and model of radio receivers 128 used by the AMD 104, antenna configuration and placement of the antenna(s) on the AMD 104, and so forth. For example, the training data may result in the neural network being trained to implicitly take into consideration antenna gain. This technique is discussed in more detail with regard to FIG. 4.

The transmitter localization module 144 may take into consideration the occupancy map 142 while determining the localization data 146. In one implementation, a set of candidate locations may be determined. Each candidate location may be representative of a possible estimated location 148 of the transmitter. For example, if only two pairs of location data 140 and radio data 134 are available, multilateration may provide two candidate locations. A candidate location that is outside of the boundary of the occupancy map 142 may be disregarded. For example, if the transmitter localization module 144 uses as few as two pairs of location data 140 and radio data 134 to determine the estimated location 148 of the transmitter, there would be two possible candidate locations. If a first candidate location is outside the boundary of the occupancy map 142, that first candidate location may be disregarded and the second candidate location would be used as the estimated location 148.

An autonomous navigation module 160 provides the AMD 104 with the ability to navigate within the physical space 102 without real-time human interaction. The autonomous navigation module 160 may implement, or operate in conjunction with, the mapping module 138 to determine one or more of the occupancy map 142, the localization data 146, and so forth. The autonomous navigation module 160 is discussed in more detail with regard to FIG. 2.

The AMD 104 autonomous navigation module 160 may generate path plan data that is indicative of the path 112 through the physical space 102 from a first location to a second location. The AMD 104 may then begin moving along the path 112. In this illustration, the path 112 illustrated is generally serpentine. For example, the path 112 shown may be used during an exploration task or sentry task. In other implementations other paths 112 may be used.

The AMD 104 may utilize one or more task modules 162. The task module 162 comprises instructions that, when executed, provide one or more functions. The task modules 162 may perform functions such as finding an object, following a user, presenting output on output devices 164 of the AMD 104, performing a sentry task by moving the AMD 104 through the physical space 102 to determine the presence of unauthorized people or wireless devices 106, and so forth.

The AMD 104 includes one or more output devices 164, such as one or more of a motor 116, light, speaker, display, projector, printer, and so forth. The one or more output devices 164 may be used to provide output during operation of the AMD 104. The output devices 164 are discussed in more detail with regard to FIG. 3.

The AMD 104 may use the network interfaces 120 to connect to a network 170. For example, the network 170 may comprise a wireless local area network, that in turn is connected to a wide area network such as the Internet.

The AMD 104 may be configured to dock or connect to a docking station 172.

The docking station 172 may also be connected to the network 170. For example, the docking station 172 may be configured to connect to the wireless local area network 170 such that the docking station 172 and the AMD 104 may communicate. The docking station 172 may provide external power which the AMD 104 may use to charge the battery 114.

In some implementations the docking station 172 may be used to calibrate the transmitter localization module 144. For example, the docking station 172 may include one or more visible features of a known size and a radio transmitter. During calibration, the AMD 104 may move to a known distance from the docking station 172 as confirmed by the cameras 126 acquiring image data 132 depicting the one or more visible features. The radio transmitter of the docking station 172 may operate, and the AMD 104 may acquire radio data 134 associated with the radio transmitter. The transmitter localization module 144 may be calibrated using data obtained from one or more physical locations 110 at known distances from the known radio transmitter.

The AMD 104 may access one or more servers 174 via the network 170. For example, the AMD 104 may utilize a wakeword detection module to determine if the user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 174 for further processing. The servers 174 may process the spoken audio and return to the AMD 104 data that may be subsequently used to operate the AMD 104.

The AMD 104 may also communicate with the wireless devices 106 or other devices 176. The other devices 176 may include one or more devices that are within the physical space 102, such as a home or associated with operation of one or more devices in the home. For example, the other devices 176 may include a doorbell camera, a garage door opener, a refrigerator, washing machine, and so forth. In some implementations the other devices 176 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
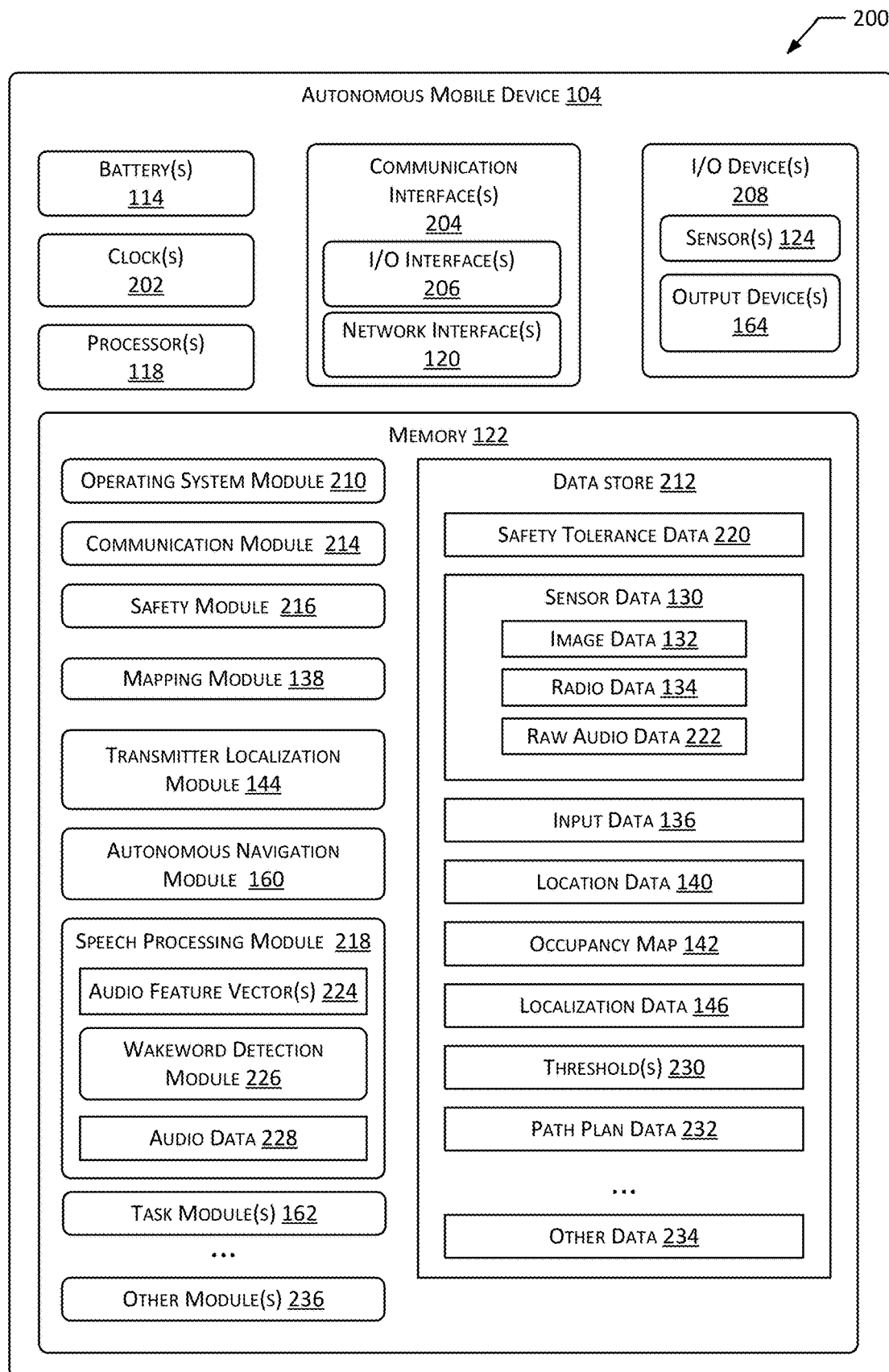
FIG. 2 is a block diagram of the components of the AMD, according to some implementations.

FIG. 2 is a block diagram 200 of the AMD 104, according to some implementations. The AMD 104 may include one or more batteries 114 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action, sensor data 130, and so forth. In one implementation, output from the clock 202 may be used to generate a timestamp that is indicative of when radio data 134 was acquired, when the AMD 104 was at a particular physical location 110, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 176 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, pointing device, scanner, and so forth. The I/O devices 208 may also include output devices 164 such as one or more of a motor 116, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 176 such as other AMDs 104, docking stations 172, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, RuBee, LoRa, and so forth.

The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 176 including other AMDs 104, servers 174, network attached storage devices, and so forth.

A communication module 214 may be configured to establish communication with other devices 176, such as other AMDs 104, an external server 174, a docking station 172, and so forth. The communications may be authenticated, encrypted, and so forth.

Other modules within the memory 122 may include a safety module 216, the mapping module 138, transmitter localization module 144, the autonomous navigation module 160, the one or more task modules 162, a speech processing module 218, or other modules 236. The modules may access data stored within the data store 212, including safety tolerance data 220, sensor data 130, thresholds 230, path plan data 232, other data 234, and so forth.

The safety module 216 may access the safety tolerance data 220 to determine within what tolerances the AMD 104 may operate safely within the physical space 102. For example, the safety module 216 may be configured to stop the AMD 104 from moving when an extensible mast of the AMD 104 is extended. In another example, the safety module 216 may access safety tolerance data 220 that specifies a minimum distance from an object that the AMD 104 is to maintain. Continuing this example, when a sensor 124 detects an object has approached to less than the minimum distance, all movement of the AMD 104 may be stopped. In another example, the safety module 216 may stop the movement of the AMD 104 if a collision is imminent. Movement of the AMD 104 may be stopped by one or more of inhibiting operations of one or more of the motors 116, issuing a command to stop motor operation, disconnecting power from one or more of the motors 116, and so forth. The safety module 216 may be implemented as hardware, software, or a combination thereof.

The safety module 216 may control other factors, such as a maximum velocity of the AMD 104 based on information obtained by the sensors 124, precision and accuracy of the sensor data 130, and so forth. For example, detection of an object by an optical sensor may include some error, such as when the distance to an object comprises a weighted average between the object and a background. As a result, the maximum velocity permitted by the safety module 216 may be based on one or more factors such as the weight of the AMD 104, nature of the floor, distance to the object, and so forth. In the event that the maximum permissible velocity differs from the maximum velocity permitted by the safety module 216, the lesser velocity may be utilized.

The mapping module 138 may use one or more of sensor data 130, input data 136, and so forth to determine the occupancy map 142 that is representative of the physical features in the physical space 102. In one implementation, during a learning phase the user may take the AMD 104 on a tour of the physical space 102, allowing the AMD 104 to explore and generate the occupancy map 142 and associated data. In another example, during subsequent operation, the AMD 104 may generate the occupancy map 142 as it moves unattended through the physical space 102.

The transmitter localization module 144 uses the radio data 134 and the location data 140 to determine the localization data 146. This is discussed in more detail with regard to FIGS. 4-6.

The autonomous navigation module 160 provides the AMD 104 with the ability to navigate within the physical space 102 without real-time human interaction. The autonomous navigation module 160 may implement, or operate in conjunction with, the mapping module 138 to determine the occupancy map 142, a navigation map, or other representation of the physical space 102. In one implementation, the mapping module 138 may use one or more simultaneous localization and mapping ("SLAM") techniques. The SLAM algorithms may utilize one or more of maps, algorithms, beacons, or other techniques to navigate. The autonomous navigation module 160 may use the navigation map to determine a set of possible paths 112 along which the AMD 104 may move. One of these may be selected and used to determine path plan data 232 indicative of a path 112. For example, a possible path 112 that is the shortest, or has the fewest turns, traverses the fewest doors, and so forth may be selected and used to determine the path 112. In one implementation, the Theta* path planning algorithm may be used to determine a path cost for each path 112, and the path cost may be used to select a particular path 112. (See "Theta*: Any-Angle Path Planning on Grids", Alex Nash, Kenny Daniel, Sven Koenig, Ariel Felner.)

The path 112 is then subsequently used to determine a set of commands that drive the motors 116 connected to the wheels. For example, the autonomous navigation module 160 may determine the first location within the physical space 102 and determine path plan data 232 that describes the path 112 to a second location.

The autonomous navigation module 160 may utilize various techniques during processing of sensor data 130. For example, image data 132 obtained from cameras 126 on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 118, in response to a command received from one or more communication interfaces 204, as determined from the sensor data 130, and so forth. For example, an external server 174 may send a command that is received using the network interface 120. This command may direct the AMD 104 to proceed to find a particular user, follow a particular user, and so forth. The AMD 104 may then process this command and use the autonomous navigation module 160 to determine the directions and distances associated with carrying out the command. For example, the command to "come here" may result in a task module 162 sending a command to the autonomous navigation module 160 to move the AMD 104 to a particular location near the user and orient the AMD 104 in a particular direction.

The speech processing module 218 may be used to process utterances of the user. Microphones 346 may acquire audio in the presence of the AMD 104 and may send raw audio data 222 to an acoustic front end (AFE). The AFE may transform the raw audio data 222 (for example, a single-channel, 16-bit audio stream sampled at 16 kHz), captured by the microphone 346, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 170 in the form of output audio data. To avoid the output audio interfering with the device's ability to detect and process input audio, the AFE or other component may use an echo cancellation algorithm to perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 174 for speech processing. The audio data 228 corresponding to audio obtained by the microphone may be processed locally on one or more of the processors 118, sent to a server 174 for routing to a recipient device or may be sent to the server 174 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104, prior to sending to the server 174, and so forth.

The speech processing module 218 may include or access an automated speech recognition (ASR) module. The ASR module may accept as input raw audio data 222, audio feature vectors 224, or other sensor data 130 and so forth and may produce as output the input data 136 comprising a text string or other data representation. The input data 136 comprising the text string or other data representation may be processed to determine the command to be executed. For example, the utterance of the command "robot, come here" may result in input data 136 comprising the text string "come here". The wakeword "robot" may be omitted from the input data 136.

The AMD 104 may utilize the one or more task modules 162. The task module 162 comprises instructions that, when executed, provide one or more functions. The task modules 162 may perform functions such as finding an object, following a user, presenting output on output devices 164 of the AMD 104, performing a sentry task by moving the AMD 104 through the physical space 102 to determine the presence of unauthorized people or wireless devices 106, and so forth. For example, the user may say aloud "robot, find my car keys". The AMD 104 may use the speech processing module 218 to determine the input data 136 and operate a task module 162 to retrieve from the localization data 146 an estimated location 148 of a transmitter that is associated with the object with the label "car keys". The task module 162 may then send a request to the autonomous navigation module 160 to determine path plan data 232 to move the AMD 104 to a location that is near the estimated location 148. The autonomous navigation module 162 may use the path plan data 232 to move the AMD 104 to the location.

The AMD 104 may connect to the network 170 using one or more of the network interfaces 120. In some implementations, one or more of the modules or other functions described here may execute on the processors 118 of the AMD 104, on the server 174, or a combination thereof. For example, one or more servers 174 may provide various functions, such as ASR, natural language understanding (NLU), provide content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store other data 234 as well. For example, localization settings may indicate local preferences such as language, user identifier data may be stored that allows for identification of a particular user, and so forth.

Figure 3:
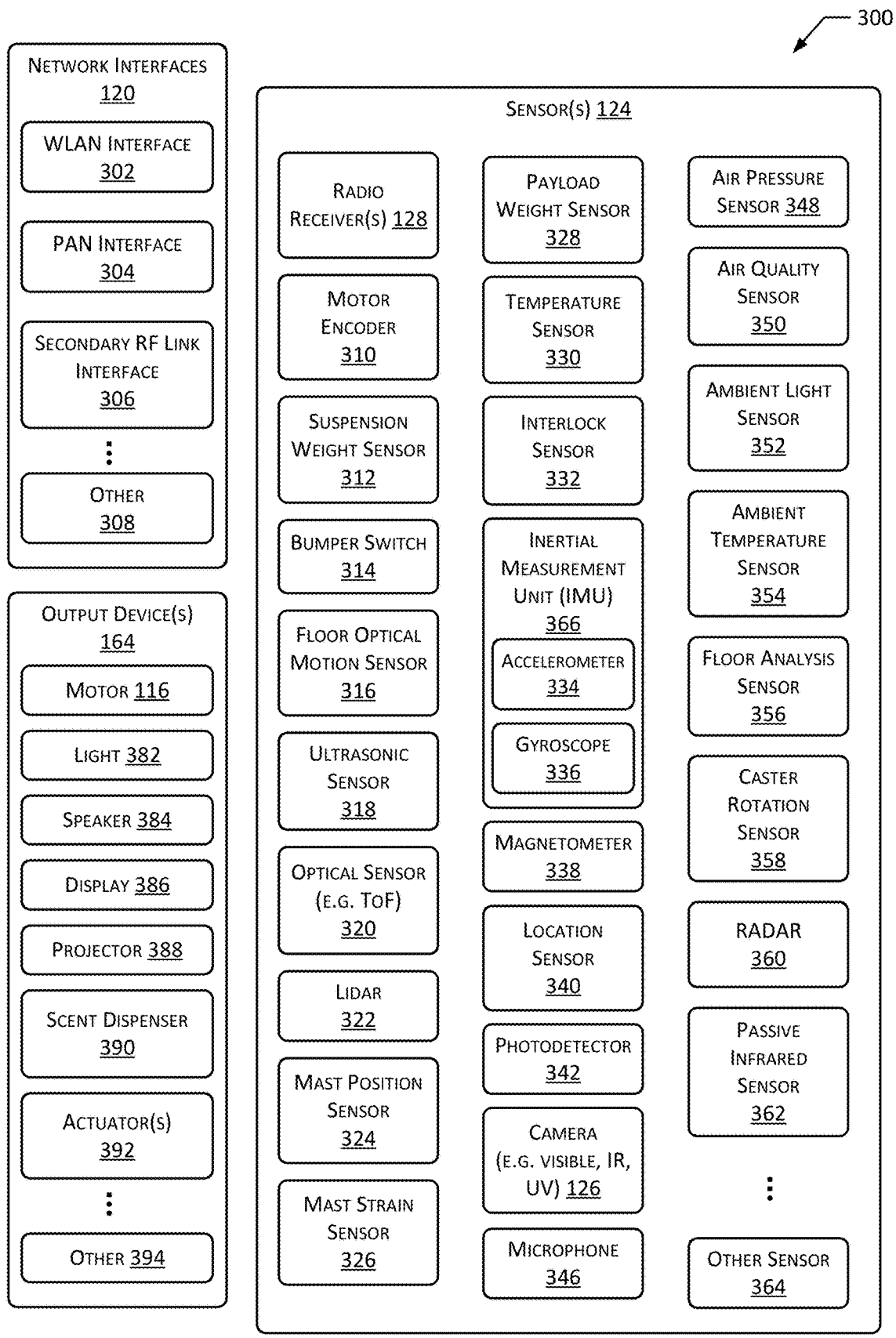
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 164, according to some implementations. The components illustrated here are provided by way of illustration and not necessarily as a limitation. For example, the AMD 104 may utilize a subset of the particular network interfaces 120, output devices 164, or sensors 124 depicted here, or may utilize components not pictured. One or more of the sensors 124, output devices 164, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, Bluetooth Low Energy (BLE), wireless USB, Z-Wave, ZigBee, or other standards. In other implementations the network interfaces 120 may be compliant with one or more other standards, such as RuBee, LoRa, and so forth.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 176 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 172, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, 5G, LTE, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

The sensors 124 may include one or more of the radio receivers 128. The radio receivers 128 may be part of the network interfaces 120, or may be separate devices. The radio receivers 128 comprise a radio receiver having an input connected to an antenna. The AMD 104 may include one or more radio receivers 128, one or more antennas, and so forth.

In one implementation the AMD 104 may have a first radio receiver 128 with a first antenna mounted at a first part of the AMD 104 while a second radio receiver 128 with has a second antenna mounted at a second part of the AMD 104. For example, a first radio receiver 128 may have a first antenna located on a main body of the AMD 104 while a second radio receiver 128 has a second antenna located atop an extensible mast of the AMD 104. In this way, the AMD 104 may acquire radio data 134 at different heights above ground. In another implementation, a single radio receiver 128 may be used, with a switching device that allows the receiver to be connected to one or more of the first antenna, the second antenna, or both antennas. In other implementations, other configurations of radio receivers 128, antennas, and so forth are possible.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 160 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited.

One or more bumper switches 314 provide an indication of physical contact between a bumper or other member that is in mechanical contact with the bumper switch 314. The safety module 216 utilizes sensor data 130 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 130 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10' FOV, allowing the sensor to have an overall FOV of 40'.

In another implementation, a structured light pattern may be provided by the optical emitter. A portion of the structured light pattern may then be detected on the object using a sensor 124 such as an image sensor or camera 126. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 160 may utilize the sensor data 130 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 130 may be generated that is indicative of the presence of objects and the relative positions, shapes, and so forth that are visible to the lidar 322. Data from the lidar 322 may be used by various modules. For example, the autonomous navigation module 160 may utilize point cloud data generated by the lidar 322 for localization of the AMD 104 within the physical space 102.

The AMD 104 may include a mast. This may be a fixed mast or an extensible mast that may be moved to one or more different heights. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 130 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 114, one or more motors 116, and so forth. In the event the temperature exceeds a threshold value, the component associated with that device temperature sensor 330 may be shut down.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

The sensors 124 may include an inertial measurement unit (IMU) 366. The IMU 366 may include one or more of an accelerometer 334 or a gyroscope 336 (or gyrometer). The accelerometer 334 provides information indicative of a direction and magnitude of an imposed acceleration. Data such as rate of change, determination of changes in direction, velocity, and so forth may be determined using the accelerometer 334. The accelerometer 334 may comprise mechanical, optical, micro-electromechanical, or other devices. For example, the accelerometer 334 may comprise a prepackaged solid-state device that provides multiple axis accelerometers 334.

The gyroscope 336 (or gyrometer) may provide information indicative of rotation of an object affixed thereto. For example, the gyroscope 336 may generate sensor data 130 that is indicative of a change in angular orientation of the AMD 104 or a portion thereof with respect to an axis. The gyroscope 336 may comprise mechanical, optical, microelectromechanical, or other devices. For example, the gyroscope 336 may comprise a prepackaged solid-state device that provides multiple axis gyroscopes 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 130 indicative of impinging light. For example, the photodetector 342 may provide data indicative of a color, intensity, duration, and so forth.

A camera 126 generates sensor data 130 indicative of one or more images. The camera 126 may be configured to detect light in one or more wavelengths including, but not limited to, terahertz, infrared, visible, ultraviolet, and so forth. For example, an infrared camera 126 may be sensitive to wavelengths between approximately 700 nanometers and 1 millimeter. The camera 126 may comprise charge coupled devices (CCD), complementary metal oxide semiconductor (CMOS) devices, microbolometers, and so forth. The AMD 104 may use image data 132 acquired by the camera 126 for object recognition, navigation, collision avoidance, user communication, and so forth. For example, a pair of cameras 126 sensitive to infrared light may be mounted on the front of the AMD 104 to provide binocular stereo vision, with the sensor data 130 comprising images being sent to the autonomous navigation module 160. In another example, the camera 126 may comprise a 10 mega pixel or greater camera that is used for videoconferencing or for acquiring pictures for the user.

The camera 126 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 126, particularly those associated with navigation or autonomous operation, may utilize a global shutter. In other implementations, the camera(s) 126 providing images for use by the autonomous navigation module 160 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 160, the task module 162, and so forth. For example, if the floor analysis sensor 356 determines that the floor is wet, the safety module 216 may decrease the velocity of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear velocity of the caster, and so forth. For example, the caster rotation sensor 358 may comprise an optical encoder and corresponding target that is able to determine that the caster transitioned from an angle of 0° at a first time to 49° at a second time. Data from the caster rotation sensor 358 may be used to determine at least a portion of the motion data.

The sensors 124 may include a radar 360. The radar 360 may be used to provide information as to a distance, lateral position, and so forth, to an object.

The sensors 124 may include a passive infrared (PIR) sensor 362. The PIR 362 sensor may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 160. One or more touch sensors may be utilized to determine contact with a user or other objects.

The AMD 104 may include one or more output devices 164. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 116 with an eccentric weight may be used to create a buzz or vibration to allow the AMD 104 to simulate the purr of a cat.

Figure 4:
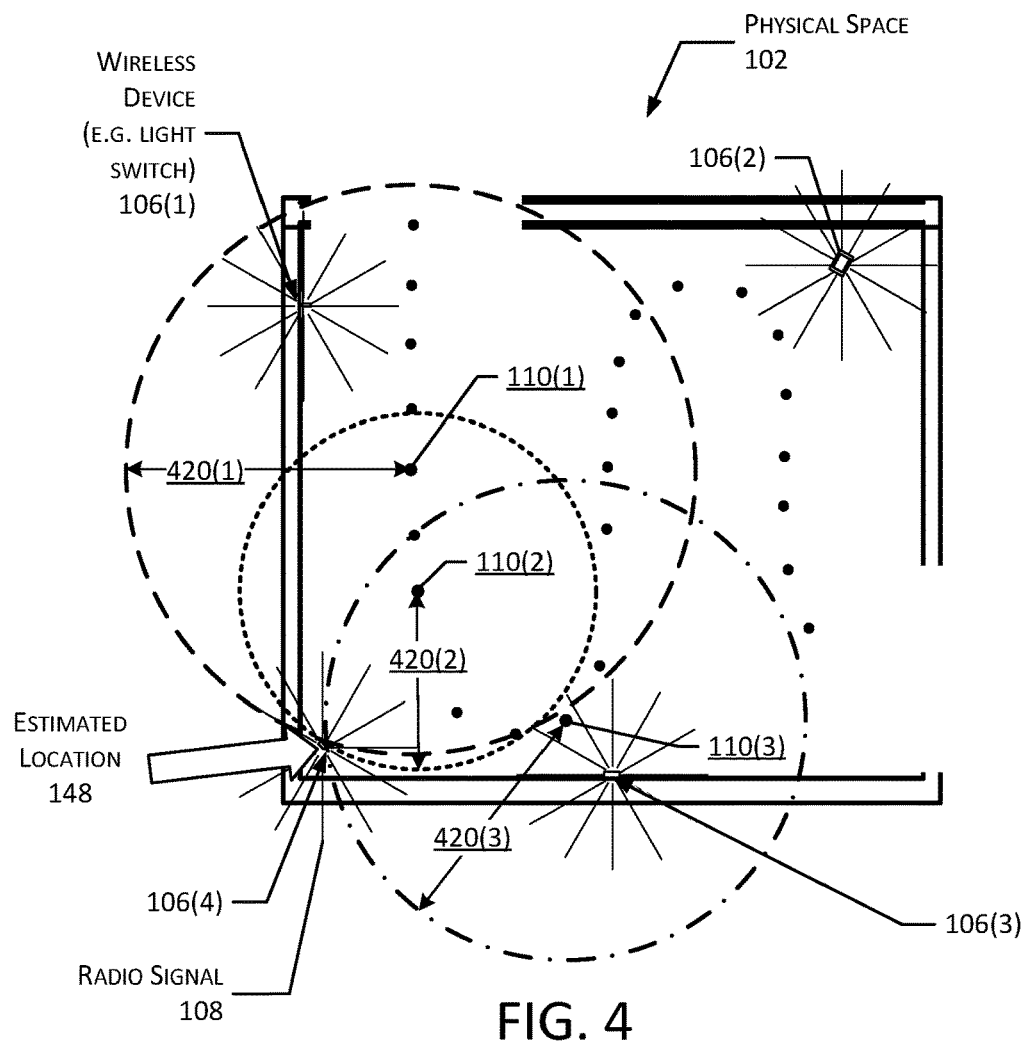
FIG. 4 illustrates radio data and a portion of the physical space with estimated distances centered on various physical locations based on location data and the radio data acquired by the AMD, according to some implementations.

FIG. 4 illustrates at 400 the radio data 134 and a portion of the physical space 102 with estimated distances centered on various physical locations 110 based on location data 140 and radio data 134 acquired by the AMD 104, according to some implementations. The process described may be performed in some implementations by the transmitter localization module 144.

The radio data 134 may comprise signal strength data 410 and one or more of transmitter ID data 150, timestamp data 414, received data 416, or other data. The radio data 134 is acquired by one or more radio receivers 128. The signal strength data 410 is indicative of a received signal strength of the radio signal 108 received by the radio receiver 128. For example, a network interface 120 that comprises a radio receiver 128 may receive a wireless frame of data and provide as output a received signal strength indicator (RSSI) value. The RSSI value may be used as the signal strength data 410.

The transmitter ID data 150, as described above, provides information that is indicative of the radio transmitter that generated the radio signal 108. For example, the transmitter ID data 150 may comprise a sender MAC address.

The timestamp data 414 is indicative of a time, such as provided by the clock 202, that is associated with the acquisition of radio data 134. For example, the timestamp data 414 may be indicative of a time a frame was received by the network interface 120, a time when the signal strength data 410 was generated, and so forth.

The received data 416 may comprise other information that was conveyed by the radio signal 108. For example, the received data 416 may comprise header data. Continuing the example, the header data in a beacon frame may include data indicative of a transmit power used by the radio transmitter. In another example, the received data 416 may comprise information indicative of whether beamforming techniques are being used by the radio transmitter of the wireless device 106. For example, an access point that is utilizing beamforming techniques, such as multiple-input and multiple-output (MIMO) techniques, may send data indicative of MIMO being available or in use.

Associated with the radio data 134 is location data 140 indicative of physical locations 110 within the physical space 102 where the radio data 134 was acquired. In some implementations the association may be based on timestamp data 414. For example, the location data 140 may include location timestamp data that is indicative of a time at which the AMD 104 was at a particular set of coordinates in the physical space 102. In some implementations the association between radio data 134 and the location data 140 may be approximate. For example, the location data 140 may be associated with radio data 134 that was acquired within a threshold time interval. Continuing the example, the location data 140 for physical location 110(2) may be acquired at time 20062701223 while the radio data 134(17) was acquired at 20062701225. If the threshold time interval is 5, then physical location 110(2) is deemed to be associated with radio data 134(17). In some implementations the threshold time interval may be based at least in part on a speed of the AMD 104. For example, as the speed of the AMD 104 increases, the threshold time interval may decrease. This increases the accuracy of the overall system 100 by minimizing errors due to a difference in position between the physical location 110 indicated in the location data 140 and the actual location in the physical space 102 where the radio data 134 was acquired.

In some implementations the AMD 104 may include multiple antennas at different heights. In addition to the location data 140, antenna height 402 may also be stored. The antenna 402 comprises height data indicative of the height of the antenna. For example, the antenna for the radio receiver 128 of the AMD 104 may be located on an extensible mast. The mast may be retracted to a height of 30 centimeters (cm) above the ground or extended to a height of 90 cm. The antenna height 402 may be stored as part of the location data 140 or the radio data 134. The antenna height 402 may be used in some implementations by the transmitter localization module 144 to determine an estimated height of the radio transmitter.

In other implementations, other data may be stored that is indicative of the antenna used to acquire the radio data 134. This data may be used to determine a particular location of that antenna.

Also shown in this illustration is the estimated distance 420 that is associated with particular location data 140 and is based on the signal strength data 410 that is associated with the physical location 110 indicated by the location data 140. The estimated distance 420 may be determined as follows.

In this illustration, physical locations 110(1), 110(2), and 110(3) are shown with associated estimated distances 420(1), 420(2), and 420(3), respectively. The estimated distances 420 may be determined using one or more techniques including, but not limited to a path loss model, a trained machine learning system, and so forth.

The strength of a received radio signal 108 is proportionate to the distance to the transmitter. This change in signal strength is referred to as a "path loss". As distance increases, the received signal strength decreases in a mathematically predictable way expressed by a path loss model. Typically, a path loss model will account for various factors such as antenna gain at a transmitter, transmitter power, antenna gain at a receiver, receiver sensitivity, and so forth. A free space model based on the equations of Harald T. Friis known as the Friis transmission equation may be expressed as follows:

$$P_r(d) = \frac{P_t G_t G_r \lambda^2}{(4\pi)^2 d^2 L}$$

where:
$P_r$ is the received power,
d is the distance between the transmitting antenna and the receiving antenna,
$P_t$ is the transmit power,
$G_t$ is the gain of the transmitting antenna,
$G_r$ is the gain of the receiving antenna,
$\lambda$ the wavelength of the radio frequency, and
L is a loss factor associated with the system, such as due to transmission line loss.
(Equation 1)

Equation 1 and the relationship therein may be manipulated to provide Equation 2:

$$PL(dB) = 10\log\frac{P_t}{P_r} = -10\log\left[\frac{\lambda^2}{(4\pi)^2 d^2}\right]$$

where:
PL is path loss in decibels
$P_r$ is the received power,
$P_t$ is the transmit power,
$\lambda$ the wavelength of the radio frequency, and
d is the distance between the transmitting antenna and the receiving antenna.
(Equation 2)

A calibration process may be performed in which a representative AMD 104 is used to gather radio data 134 and location data 140 at a 1 meter distance. Given the constrained and known hardware of the AMD 104, and the unknown nature of the transmitters, this may result in Equation 2 being simplified to Equation 3:

$$P_R(dBm) = A - 10n \log d$$

where:
$P_R$ is a path loss at distance d
n is a signal decay exponent, that may have a value between 2 to 4, and
A is the received signal at 1 meter distance.
(Equation 3)

The path loss model may implement Equation 3, and may further be adjusted to consider an approximate room size. During the calibration process, additional data may be obtained at other distances that are within a range that is expected to be typical of a room in the physical space 102. A regression model may be determined that takes into account actual received signal strength data, such as RSSI, at known distances. The path loss model may accept as input the signal strength data 410 and provide as output the estimated distance 420.

In another implementation, the calibration process may be used to acquire a set of training data comprising signal strength data at known distances from a radio transmitter. The training data may be acquired with the AMD 104 at different orientations relative to the radio transmitter. One or more of the antennas of the radio transmitter, or those attached to the radio receiver 128 of the AMD 104, may experience some gain. By acquiring training data at different orientations of one or more of the AMD 104 or the radio transmitter, the effects of any gain may be mitigated.

The training data is used to train a machine learning system to accept signal strength data 410 as input and produce as output an estimated distance 420. For example, a neural network may be trained using supervised training techniques with the training data. The trained neural network may then be stored and executed on the AMD 104 to determine the estimated distance 420.

The plurality of estimated distances 420 and their associated location data 140 indicative of their respective physical locations 110 may be used to determine the estimated location 148 of a transmitter. In one implementation, a multilateration algorithm may be used to determine the estimated location 148 of a transmitter.

In some implementations, the estimated distances 420 may be determined for each of the signal strength data 410 in the radio data 134. In other implementations the estimated distances 420 may be determined for a subset of the signal strength data 410.

The multilateration algorithm may implement a range multilateration algorithm. This may be visualized as finding an intersection point between a set of three or more circles. Each circle is centered on a different physical location 110 and has a radius equal to the estimated distance 420. To determine an estimated location 148 of a transmitter in two-dimensional space, at least three pairs of location data 140 and estimated distances 420 are needed. In a similar fashion, an estimated height relative to the AMD 104 may be determined using radio data 134 obtained at different antenna heights, allowing the estimated location 148 of a transmitter to be established in three-dimensional space. In this example, three pairs of location data 110(1)-(3) and corresponding estimated distances 420(1)-(3) are shown. The estimated location 148 of a transmitter is the point of the intersection between the three circles corresponding to the estimated distances 420(1)-(3). In some implementations, the intersection may describe an area instead of a point. In this situation, a point within the intersection may be designated as the estimated location 148 of a transmitter. For example, a centroid of the intersected region may be designated as the estimated location 148 of a transmitter.

In one implementation the multilateration algorithm using three physical locations 110 may be described using the following equations:

$$(x-x_1)^2+(y-y_1)^2=d_1^2$$

where:

x is the location of the radio transmitter with respect to an X axis, $x_1$ is the location of a first physical location 110(1) with respect to the X axis, y is the location of the radio transmitter with respect to a Y axis, $y_1$ is the location of a first physical location 110 with respect to the Y axis, and $d_1^2$ is the estimated distance 420(1) from the first physical location 110(1) to the radio transmitter.

$$(x-x_2)^2+(y-y_2)^2=d_2^2 \quad \text{(Equation 4)}$$

where:

x is the location of the radio transmitter with respect to an X axis, $x_2$ is the location of a second physical location 110(2) with respect to the X axis, y is the location of the radio transmitter with respect to a Y axis, $y_2$ is the location of a second physical location 110(2) with respect to the Y axis, and $d_2^2$ is the estimated distance 420(2) from the second physical location 110(2) to the radio transmitter.

$$(x-x_3)^2+(y-y_3)^2=d_3^2 \quad \text{(Equation 5)}$$

where:

x is the location of the radio transmitter with respect to an X axis, $x_3$ is the location of a third physical location 110(3) with respect to the X axis, y is the location of the radio transmitter with respect to a Y axis, $y_3$ is the location of a third physical location 110(3) with respect to the Y axis, and $d_3^2$ is the estimated distance 420(3) from the third physical location 110(3) to the radio transmitter.

(Equation 6)

Equations 4-6 may be used to determine equations 7 and 8 that solve for the coordinates of the estimated location 148 of a transmitter. The estimated location 148 of a transmitter with respect to the X axis may be calculated using equation 7, while the estimated location 148 of a transmitter with respect to the Y axis may be calculated using equation 8.

$$X = \frac{\begin{vmatrix} (d_1^2-d_2^2) & -(x_1^2-x_2^2) & -(y_1^2-y_2^2) & 2(y_2-y_1) \\ (d_1^2-d_3^2) & -(x_1^2-x_3^2) & -(y_1^2-y_3^2) & 2(y_3-y_1) \end{vmatrix}}{\begin{vmatrix} 2(x_2-x_1) & 2(y_2-y_1) \\ 2(x_3-x_1) & 2(y_3-y_1) \end{vmatrix}} \quad \text{(Equation 7)}$$

$$Y = \frac{\begin{vmatrix} 2(x_2-x_1) & (d_1^2-d_2^2) & -(x_1^2-x_2^2) & -(y_1^2-y_2^2) \\ 2(x_3-x_1) & (d_1^2-d_3^2) & -(x_1^2-x_3^2) & -(y_1^2-y_3^2) \end{vmatrix}}{\begin{vmatrix} 2(x_2-x_1) & 2(y_2-y_1) \\ 2(x_3-x_1) & 2(y_3-y_1) \end{vmatrix}} \quad \text{(Equation 8)}$$

By solving equations 7 and 8 using at least three pairs of location data 140 and estimated distances 420, the estimated location 148 of a transmitter may be determined. In other implementations, additional equations may be used, and these equations extended to allow for the use of more than three pairs of location data 140 and estimated distances 420. For example, six pairs of location data 140 and estimated distances 420 may be used to determine the estimated location 148 of a transmitter.

Variations of these equations may also be used to determine an estimated height of the radio transmitter. For example, radio data 134 comprising signal strength data 410 obtained at different heights may be used to determine a height above ground in a similar fashion. In some implementations, a spherical multilateration may be used.

Different techniques may be used to select particular pairs of location data 140 and estimated distances 420 used to determine the estimated location 148 of a transmitter. In one implementation, a random or pseudo-random selection may be made from a first set of data that is associated with particular transmitter ID data 150. In another implementation, the selection may be made such that there is a minimum separation between the physical locations 110 selected.

In some implementations the accuracy of the estimated distance 420 relative to actual distance may be improved by restricting the input to signal strength data 410 that is within a specified range. For example, the signal strength data 410 may be limited to values between a minimum signal strength value and a maximum signal strength value. This restriction may result in improved accuracy as the technique used may be limited to a more linear function. At extremes of actual distance, the changes in signal strength may be minimal compared to the actual change in distance. By removing from consideration those signal strength values, the resulting estimated distance 420 may be more accurate.

Figure 5:
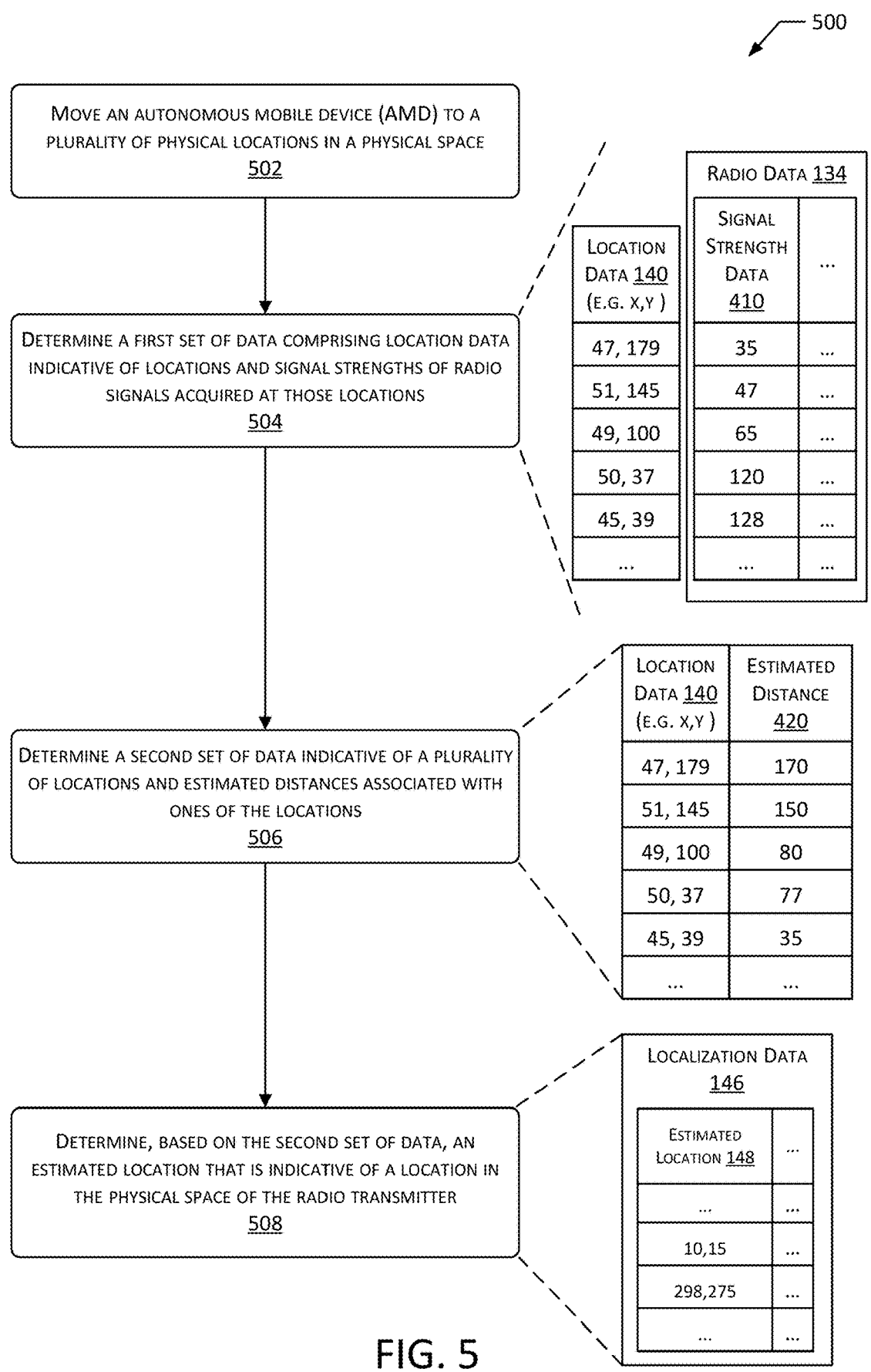
FIG. 5 is a flow diagram of a process for determining an estimated location of a transmitter, according to some implementations.

FIG. 5 is a flow diagram 500 of a process for determining an estimated location 148 of a transmitter, according to some implementations. The process may be implemented at least in part by one or more of the AMD 104, the docking station 172, a server 174, or other device 176.

At 502 the AMD 104 is moved to a plurality of physical locations 110 in the physical space 102. For example, the AMD 104 may move autonomously while exploring the physical space 102, while performing a sentry function, responsive to a task assigned by a user, and so forth. In some implementations, the acquisition of the location data 140 and the radio data 134 is opportunistic, in that the AMD 104 is moving along a path 112 that is associated with a task other than explicitly determining the localization data 146. In other implementations, the transmitter localization module 144 may operate in conjunction with the autonomous navigation module 160 to determine and navigate along a path 112 to acquire location data 140 and radio data 134 for use by the transmitter localization module 144.

At 504 a first set of data is determined. The first set of data may comprise a plurality of pairs of location data 140 and signal strength data 410. For example, the location data 140 is indicative of physical locations 110 in a physical space 102. The signal strength data 410 is indicative of a signal strength of a radio signal 108 received using a radio receiver 128 of the AMD 104 while at or near the physical location 110 in the physical space 102.

In some implementations, one or more filters may be used to limit data that is included in the first set of data. For example, the first set of data may be limited to signal strength data 410 that is greater than a minimum signal strength. Signal strength values that are less than the minimum signal strength may result in estimated distances 420 that are less reliable, decreasing overall accuracy of the estimated location 148. As a result, by removing these from the first set of data, overall accuracy of the estimated location 148 is improved.

As the number of pairs of location data 140 and signal strength data 410 in the first set of data increases, the accuracy of the resulting estimated location 148 may increase as well. In some implementations the transmitter localization module 144 may be configured to utilize a minimum number of pairs to determine the estimated location 148. This minimum number of pairs may be determined based at least in part on the signal strength data 410 of one or more pairs in the first set of data. For example, lower signal strengths may be associated with a less accurate estimated distance 420. As a result, more pairs having signal strength data 410 with values less than a threshold may be used during operation. Continuing the example, fifteen pairs may be used when signal strengths are less than the threshold. In comparison, three pairs may be used when the signal strengths for each pair is greater than the threshold.

As the AMD 104 moves through the physical space 102 and acquires additional data, the number of pairs in the first set of data may increase. As a result, the subsequent accuracy of an estimated location 148 may improve over time.

At 506 a second set of data is determined, based on the first set of data. The second set of data comprises a plurality of the location data 140 indicative of the physical locations 110 in the physical space 102 and estimated distances 420 that are associated with individual ones of those physical locations 110.

As described above, the estimated distance 420 is determined based on signal strength data 410 that is indicative of the signal strength of the received radio signal 108 that is associated with the physical location 110 where the radio data 134 was acquired. For example, the transmitter localization module 144 may be used to determine an estimated distance 420 for one or more of the physical locations 110 specified by the location data 140 in the first set of data. In one implementation, the estimated distance 420 may be determined by processing the signal strength data 410 indicative of the signal strength of the received radio signal 108 with a trained machine learning system. In another implementation the estimated distance 420 may be determined using a path loss algorithm.

The first set of data may be filtered to determine the second set of data. In one implementation, the first set of data may be filtered to remove pairs of location data 140 and signal strength data 410 in which the signal strength data 410 is outside of a specified range. In another implementation, pairs may be selected from the first set of data based on statistical distribution. For example, a normal distribution may be applied to the first set of data and pairs corresponding to a particular portion of the normal distribution may be selected for inclusion in the second set of data. In yet another implementation, the pairs may be selected such that each is a minimum distance from each other, with respect to the physical space 102.

The determination of an estimated location 148 of a transmitter involves a comparison of the signal strength data 410 corresponding to the same radio transmitter. The radio transmitter may be determined in some implementations based on data conveyed by the radio signal 108. In one implementation, the received radio signals 108 in the first set of data may be determined to be associated with the radio transmitter based on one or more of: a beacon data conveyed by the received radio signal 108, a media access control (MAC) address conveyed by the received radio signal 108, or a network address conveyed by the received radio signal 108. In other implementations, the determination of the radio transmitter may use data about the radio signal 108 itself, rather than the data encoded or conveyed by the radio signal 108. For example, a radio transmitter may be characterized based on transmit frequency, frequency drift, modulation, spectral fingerprint, and so forth.

At 508, based on the second set of data, an estimated location 148 of a transmitter is determined that is indicative of a location in the physical space 102 of a radio transmitter. The second set of data may be filtered to particular transmitter ID data 150 indicative of a single radio transmitter. This set of filtered data may then be provided as input to the transmitter localization module 144 that uses the multilateration algorithm to determine the estimated location 148 of a transmitter. Continuing the example, the transmitter localization module 144 may provide as output the localization data 146 indicative of the estimated locations 148 for respective radio transmitters as distinguished by their transmitter ID data 150.

In some implementations, user input or data from other systems may be obtained and used to determine the label data 152 associated with particular transmitter ID data 150. For example, in implementations where the transmitter ID data 150 is a sender MAC address, a portion of the MAC address may be used to retrieve information such as a manufacturer. Continuing the example, label data 152 such as "Amazon Fire Tablet" may be determined based on the transmitter ID data 150.

As described above, in some implementations an estimated height of the radio transmitter may be determined. For example, a first portion of the first set of data may be obtained with an antenna of a radio receiver 128 at a first height. A second portion of the first set of data may be obtained with the antenna of the radio receiver 128 at a second height. For example, the antenna may be located on the extensible mast, that may be extended. The estimated location 148 of a transmitter may also be indicative of an estimated height in the physical space 102 of the radio transmitter. This second portion may be considered modified data. For example, the modified data may comprise the location data 140, the signal strength data 410 at a first height, and the signal strength data 410 at a second height.

In some implementations data may be removed from the first set of data to improve accuracy. A wireless device 106 with a radio transmitter that is moving may not be localizable using a single AMD 104, as the single AMD 104 is only able to determine radio data 134 from a single physical location 110 at a time. To minimize erroneous determinations of estimated locations 148, the system 100 may disregard radio data 134 that varies beyond a threshold amount.

In one implementation, signal strength data 410 associated with approximately the same physical location 110 as obtained at two or more times may be used to determine if the radio transmitter has moved. For example, if the radio transmitter moves between a first time and a second time, the resulting RSSI value at the AMD 104 may change substantially. As a result, the data associated with that radio transmitter, such as having particular transmitter ID data 150, may be removed from the first set of data or may not be considered for inclusion in the second set of data.

A first received signal strength 410(1) of a first signal, from the radio transmitter, that is received at a first physical location 110(1) at a first time, is determined. A second received signal strength 410(2) of a second signal, also from the radio transmitter, that is received at a second physical location 110(2) at a second time, is determined. The second physical location 110(2) is within a threshold distance of the first physical location 110(1). For example, the AMD 104 may be unable to return to exactly the same location at the second time. This may be due to a particular path 112 that the AMD 104 is following, due to noise in the location data 140, and so forth. However, if the AMD 104 is within the threshold distance, such as 10 cm, the data may be compared. A difference between the first received signal strength 410(1) and the second received signal strength 410(2) is determined to exceed a threshold value. For example, the threshold value may be based on a path loss associated with the threshold distance. Continuing the example, if the threshold distance is 10 cm, the threshold value may indicate that the expected variation is an RSSI value of 3. The threshold value may also include some additional factor to allow for variation in transmitter output power, changing environmental conditions, and so forth. Based on the difference exceeding the threshold value, the radio transmitter may be determined to have moved within the physical space 102.

Because the estimated distance 420 is based on the signal strength data 410, systems that change the received signal strength may adversely affect operation of the transmitter localization module 144. For example, if the radio transmitter changes power output levels, uses beamforming techniques to change antenna gain patterns, uses different directional antennas, and so forth, the received signal strength at the same physical location 110 may change even if both the radio transmitter and the AMD 104 remain stationary. Continuing the example, a wireless device 106 such as an access point that uses beamforming techniques such as multiple-input and multiple-output (MIMO), may result in erroneous signal strength data 410 as the antenna gain pattern moves around the physical space 102 to communicate with different devices. As a result, the estimated distance 420 for such a device would be inaccurate. In some implementations the transmitter localization module 144 may disregard radio data 134 that is indicative of such variations.

In one implementation, the transmitter localization module 144 may determine that one or more received radio signals 108 are associated with a radio transmitter employing beamforming. This determination may be based on determining a first received signal strength of a first signal, from the radio transmitter, that is received at a first physical location 110(1). A second received signal strength of a second signal, from the radio transmitter, that is received at a second physical location 110(2), is also determined. The second physical location 110(2) is within a threshold distance of the first physical location 110(1). A difference between the first received signal strength and the second received signal strength is determined. The difference may be compared to a threshold value. The threshold value may be determined as being less than or equal to a decrease in received signal strength based on a path loss associated with the threshold distance. A difference that exceeds the threshold value may result in a determination that the radio transmitter is employing beamforming or is otherwise unsuitable for localization. The first set of data or the second set of data may omit the radio data 134 associated with the received radio signals 108 from the radio transmitter deemed to be unsuitable.

Figure 6:
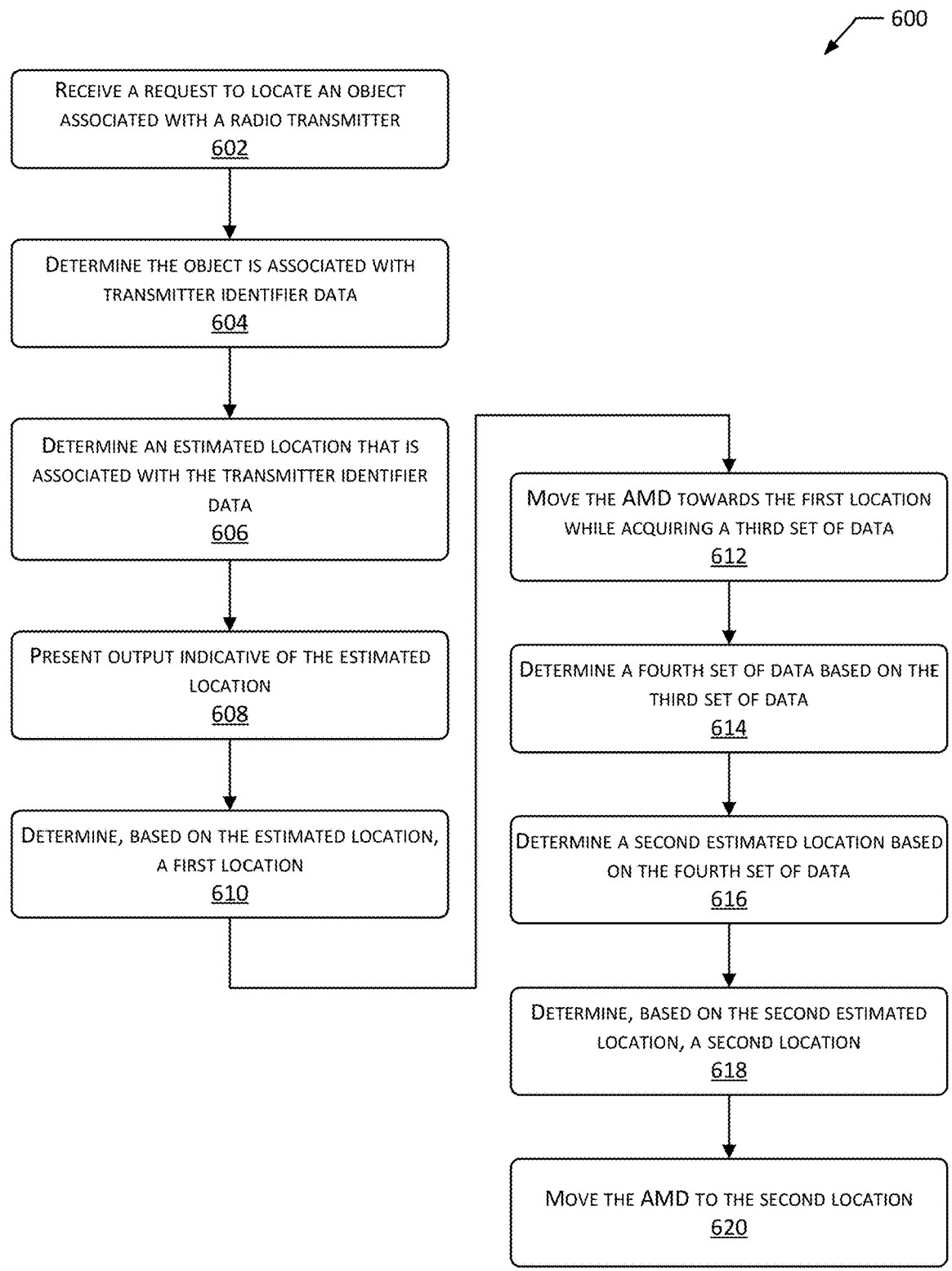
FIG. 6 is a flow diagram of a process for utilizing the AMD to locate an object in the physical space that includes a radio transmitter, according to some implementations.

FIG. 6 is a flow diagram 600 of a process for utilizing the AMD 104 to locate an object in the physical space 102 that includes a radio transmitter, according to some implementations. The process may be implemented at least in part by one or more of the AMD 104, the docking station 172, a server 174, or other device 176.

At 602, a request is received to locate an object associated with a radio transmitter. For example, the user may say to the AMD 104 "robot, find my phone". After processing the speech received by the microphones 346 of the AMD, input data 136 indicative of the request is determined.

At 604, the object is determined to be associated with transmitter ID data 150. For example, the label data 152 may be searched to find a match for "my phone". Once a match is found, the corresponding transmitter ID data 150 is determined.

At 606, an estimated location 148 of a transmitter is determined that is associated with the transmitter ID data 150. Continuing the example, given the transmitter ID data 150, the corresponding estimated location 148 of a transmitter is retrieved from the localization data 146.

In other implementations, the label data 152 may be used to directly retrieve the corresponding estimated location 148 of a transmitter. For example, the localization data 146 may be searched for "my phone" and the corresponding estimated location 148 of a transmitter may be returned for one or more matches, if any.

In some implementations, the AMD 104 may provide output using one or more output devices 164 that is indicative of the estimated location 148 of a transmitter. For example, a picture of the estimated location 148 of a transmitter may be presented on the display 386. At 608, output indicative of the estimated location 148 is presented.

At 610, a first location in the physical space 102 is determined based on the estimated location 148 of a transmitter. The first location may be determined using data from the occupancy map 142. For example, the first location may be determined as a location that is no closer than 30 cm and no farther than 150 cm from the estimated location 148 of a transmitter that is within an open area containing no obstacles, as indicated by the occupancy map 142.

At 612 the AMD 104 is moved towards the first location. For example, the autonomous navigation module 160 may use the first location as a destination, and may determine path plan data 232 from a current location of the AMD 104 to the first location. The AMD 104 may then use the path plan data 232 to actuate the motors 116 to move the AMD 104.

In some implementations, the AMD 104 may continue to acquire location data 140 and signal strength data 410 while moving towards the first location. This additional data may be used to determine a second estimated location 148(2) of the transmitter, increasing the precision compared to the estimated location 148. At 612, while the AMD 104 is moving towards the first location, the AMD 104 may acquire a third set of data. The third set of data may comprise a plurality of pairs of location data 140 and signal strength data 410. The autonomous navigation module 160 may use a search path approach while moving towards the first location. For example, the search path approach may include additional movements to increase the physical distance at different physical locations 110. Continuing the example, the search path may include one or more "zig zags" or a serpentine movement that is centered on a straight-line path towards the first location.

At 614, a fourth set of data is determined, based on the third set of data. The fourth set of data comprises a plurality of the location data 140 indicative of the physical locations 110 in the physical space 102 and estimated distances 420 that are associated with individual ones of those physical locations 110.

At 616, a second estimated location 148(2) of the transmitter is determined based on the fourth set of data. For example, the transmitter localization module 144 may perform a multilateration using the fourth set of data to determine the second estimated location 148(2).

At 618, based on the second estimated location 148(2) of the transmitter, a second location is determined. For example, as at 610, the second location may be determined using data from the occupancy map 142.

At 620 the AMD 104 is moved to the second location. For example, the autonomous navigation module 160 may discontinue movement towards the first location and instead use the second location as a destination.

In some implementations a first orientation may be determined. The first orientation may be indicative of a direction from the first location towards the estimated location 148 of a transmitter. The AMD 104 may move to the first location and moves to assume the first orientation. The first orientation, that in which the body of the AMD 104 appears to be pointing towards the estimated location 148 of a transmitter, may provide a cue to the user as to where the estimated location 148 of a transmitter, and thus the associated wireless device 106, is. In other implementations the AMD 104 may include one or more moveable elements, such as a moveable display 386, a manipulator arm, and so forth. The first orientation may be used to align one or more of these moveable elements instead of, or in addition to, the body of the AMD 104. For example, the AMD 104 may move to the first location and pan the display 386 so that a line perpendicular to a surface of the display 386 passes through the estimated location 148 of a transmitter.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    moving an autonomous mobile device (AMD) to a first location in a physical space;
    acquiring first signal strength data of a radio signal at the first location;
    moving the AMD to a second location in the physical space;
    acquiring second signal strength data of the radio signal at the second location;
    moving the AMD to a third location in the physical space;
    acquiring third signal strength data of the radio signal at the third location, wherein the radio signal is outputted by a transmitter;
    determining, based on the first signal strength data, a first estimated distance from the first location to the transmitter;
    determining, based on the second signal strength data, a second estimated distance from the second location to the transmitter;
    determining, based on the third signal strength data, a third estimated distance from the third location to the transmitter;
    determining an estimated location of the transmitter in the physical space based on: the first, the second, and the third estimated distances and the first, the second, and the third locations;
    placing an antenna of the AMD at a first height above ground;
    determining modified first signal strength data with the antenna at the first height;
    determining modified second signal strength data with the antenna at the first height;
    determining modified third signal strength data with the antenna at the first height; and
    determining an estimated height of the transmitter, based on the modified first signal strength data, the modified second signal strength data, and the modified third signal strength data.

2. The method of claim 1, further comprising:
    determining a fourth location that is within a first distance of the estimated location;

determining, based on the fourth location and the estimated location, a first orientation of the AMD at the fourth location such that the AMD is pointed towards the estimated location; and moving the AMD to the fourth location and the first orientation.

3. The method of claim 1, further comprising:

determining that the radio signal acquired at the first, the second, and the third locations is associated with one or more of:
 same beacon data,
 a same media access control (MAC) address, or
 a same network address.

4. The method of claim 1, further comprising:

determining a command to locate an object associated with the transmitter;

determining the object is associated with first data, wherein the first data is indicative of one or more of:
 beacon data,
 a media access control (MAC) address, or
 a network address;

wherein the radio signal is associated with one or more of the first data;

determining a fourth location based on the estimated location; and moving the AMD to the fourth location.

5. The method of claim 1, the determining the estimated location comprising a multilateration algorithm, wherein the estimated location corresponds to a point of intersection between:
 a first circle centered at the first location and having a first radius of the first estimated distance;
 a second circle centered at the second location and having a second radius of the second estimated distance; and
 a third circle centered at the third location and having a third radius of the third estimated distance.

6. The method of claim 1, wherein the placing the antenna of the AMD at the first height above ground comprises:

extending an extensible mast of the AMD to the first height, wherein the antenna is part of the extensible mast.

7. The method of claim 1, further comprising:

acquiring, with a first device, first data comprising:
 second data indicative of a fourth location in the physical space that is associated with the first device; and
 third data indicative of fourth signal strength data of a received radio signal at the fourth location; and wherein the determining the estimated location of the transmitter in the physical space is further based on the first data.

8. A method implemented at least in part by an autonomous mobile device (AMD), the method comprising:

determining signal strength data indicative of a signal strength of a radio signal received using a radio receiver of the AMD at a plurality of physical locations in a physical space, wherein the radio signal is outputted by a radio transmitter;

determining, based on the signal strength data, estimated distances to the radio transmitter that are associated with ones of the physical locations, wherein each of the estimated distances is based on the signal strength of the received radio signal that is associated with the one of the physical locations in the physical space;

determining, based on the estimated distances, an estimated location in the physical space of the radio transmitter;

determining a first location that is within a first distance of the estimated location;

determining, based on the first location and the estimated location, a first orientation at the first location such that the AMD is pointed towards the estimated location; and moving the AMD to the first location and the first orientation.

9. The method of claim 8, wherein:

a first portion of the signal strength data is obtained with an antenna of a radio receiver at a first height;

a second portion of the signal strength data is obtained with the antenna of the radio receiver at a second height; and further wherein the estimated location is indicative of an estimated height in the physical space of the radio transmitter.

10. The method of claim 8, further comprising:

determining a first received signal strength of a first signal, from the radio transmitter, that is received at a first physical location at a first time;

determining a second received signal strength of a second signal, from the radio transmitter, that is received at a second physical location at a second time, wherein the second physical location is within a threshold distance of the first physical location;

determining a difference between the first received signal strength and the second received signal strength exceeds a threshold value, wherein the threshold value is based on a path loss associated with the threshold distance; and determining the radio transmitter has moved within the physical space.

11. The method of claim 8, further comprising:

determining that one or more received radio signals are associated with the radio transmitter, wherein the determining that the one or more received radio signals are associated with the radio transmitter comprises:
 determining a first received signal strength of a first signal, from the radio transmitter, that is received at a first physical location;
 determining a second received signal strength of a second signal, from the radio transmitter, that is received at a second physical location, wherein the second physical location is within a threshold distance of the first physical location;
 determining a difference between the first received signal strength and the second received signal strength exceeds a threshold value, wherein the threshold value is less than or equal to a decrease in received signal strength based on a path loss associated with the threshold distance; and
 omitting from the signal strength data the one or more received radio signals that are associated with the radio transmitter.

12. The method of claim 8, further comprising:

aligning one or more moveable elements of the AMD using the first orientation.

13. The method of claim 8, further comprising:

determining the radio signals in the signal strength data are associated with the radio transmitter based on one or more of:
 beacon data conveyed by the received radio signal,
 a media access control (MAC) address conveyed by the received radio signal, or
 a network address conveyed by the received radio signal.

14. The method of claim 8, further comprising:
moving the AMD to a set of predetermined physical locations at known distances from a second radio transmitter;
determining second signal strength data indicative of a signal strength of a radio signal outputted by the second radio transmitter at each of the set of predetermined physical locations;
training a machine learning system using the known distances and the second signal strength data; and
wherein the estimated distances are determined by processing the signal strength of the radio signal with the machine learning system.

15. The method of claim 8, the determining the estimated location further comprising:
determining, based on the estimated distances, a first candidate location and a second candidate location;
determining, based on an occupancy map that is indicative of one or more obstacles in the physical space, that the first candidate location is outside a boundary of the occupancy map; and
determining the second candidate location is the estimated location.

16. An autonomous mobile device (AMD) comprising:
a radio receiver;
one or more memories storing first computer-executable instructions; and
one or more processors to execute the first computer-executable instructions to:
determine, with the radio receiver, signal strength data indicative of a signal strength of a radio signal received at a plurality of locations in a physical space, wherein the radio signal is outputted by a radio transmitter located in the physical space;
determine, based on the signal strength data, estimated distances to the radio transmitter that are associated with ones of the plurality of locations in the physical space, wherein each of the estimated distances is based on the signal strength of the radio signal at the ones of the plurality of locations in the physical space;
determine, based on the estimated distances, a first estimated location that is indicative of a location in the physical space;
receive a command to locate an object that is associated with the radio transmitter;
determine a first location based on the first estimated location;
move the AMD towards the first location, wherein second signal strength data is acquired during the move; and
determine, based at least on the second signal strength data, a second location closer to the first estimated location.

17. The AMD of claim 16, further comprising:
an extensible mast;
an antenna mounted to the extensible mast, wherein the antenna is connected to the radio receiver; and
the one or more processors to further execute the first computer-executable instructions to:
extend the extensible mast to a first height while using the radio receiver to acquire a first set of signal strengths of the radio signal;
extend the extensible mast to a second height while using the radio receiver to acquire a second set of signal strengths of the radio signal;
the signal strength data further comprising a plurality of:
height data indicative of a height of the antenna that is associated with individual ones of the signal strength of the radio signal that is associated with one of the plurality of locations; and
determine an estimated height in the physical space of the radio transmitter based at least in part on the height data and the individual ones of the signal strength.

18. The AMD of claim 16, the one or more processors to further execute the first computer-executable instructions to:
determine the object is associated with first data, wherein the first data is indicative of one or more of:
beacon data,
a media access control (MAC) address, or
a network address; and
wherein the signal strength data comprises the first data.

19. The AMD of claim 16, the one or more processors to further execute the first computer-executable instructions to:
determine, based on the second signal strength data, an estimated distance;
determine, based on the estimated distance, a second estimated location;
determine the second location based on the second estimated location; and
move the AMD towards the second location.

20. The AMD of claim 16, the one or more processors to further execute the first computer-executable instructions to:
receive, from a first device, first data comprising:
a third location in the physical space that is associated with the first device; and
a signal strength of a received radio signal that is associated with the third location; and
wherein the second signal strength data comprises the first data.

* * * * *